United States Patent
Jensen et al.

(10) Patent No.: US 9,579,827 B2
(45) Date of Patent: Feb. 28, 2017

(54) METHOD OF ACCELERATING THE CURING PROCESS IN RESIN OVERFLOW SYSTEMS FOR THE USE IN CASTING PROCESSES

(71) Applicant: SIEMENS AKTIENGESELLSCHAFT, München (DE)

(72) Inventors: Martin Jensen, Aalborg (DK); Simon Kwiatkowski Pedersen, Aalborg (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/739,039

(22) Filed: Jun. 15, 2015

(65) Prior Publication Data

US 2015/0283731 A1    Oct. 8, 2015

Related U.S. Application Data

(62) Division of application No. 13/950,340, filed on Jul. 25, 2013, now Pat. No. 9,085,657.

(30) Foreign Application Priority Data

Aug. 8, 2012 (EP) .................................. 12179633

(51) Int. Cl.
| | |
|---|---|
| *B29C 31/02* | (2006.01) |
| *B29C 44/42* | (2006.01) |
| *B29B 17/00* | (2006.01) |
| *B29C 70/48* | (2006.01) |
| *C08F 10/00* | (2006.01) |
| *C08G 59/02* | (2006.01) |
| *B29K 25/00* | (2006.01) |

(52) U.S. Cl.
CPC .......... *B29B 17/0005* (2013.01); *B29C 31/02* (2013.01); *B29C 44/42* (2013.01); *B29C 70/48* (2013.01); *C08F 10/00* (2013.01); *C08G 59/022* (2013.01); *B29K 2025/00* (2013.01); *Y10T 137/5762* (2015.04)

(58) Field of Classification Search
None
See application file for complete search history.

(56) References Cited

U.S. PATENT DOCUMENTS

| | | | | |
|---|---|---|---|---|
| 3,702,060 A | * | 11/1972 | Cumming | E21D 20/025 405/259.2 |
| 3,951,886 A | | 4/1976 | Miyake et al. | |
| 4,167,359 A | * | 9/1979 | Beveridge | E21D 20/02 405/259.4 |
| 5,749,733 A | * | 5/1998 | Qian | C09J 4/00 106/35 |
| 6,146,481 A | | 11/2000 | Avni et al. | |
| 6,174,396 B1 | | 1/2001 | Casteel et al. | |
| 2004/0063844 A1 | * | 4/2004 | Urs | C08G 18/10 524/492 |
| 2005/0040553 A1 | | 2/2005 | Slaughter et al. | |
| 2005/0131128 A1 | | 6/2005 | Hughes et al. | |
| 2013/0085193 A1 | * | 4/2013 | Burdeniuc | C08G 18/18 521/115 |
| 2014/0046000 A1 | | 2/2014 | Jensen | |

FOREIGN PATENT DOCUMENTS

| | | | | |
|---|---|---|---|---|
| CN | 1249772 A | | 4/2000 | |
| CN | 102015264 A | | 4/2011 | |
| DE | 4129812 A1 | | 4/1992 | |
| EP | 1469012 A1 | * | 10/2004 | ............ B65D 65/46 |
| JP | H 02261115 A | | 10/1990 | |
| WO | WO 9831750 A1 | | 7/1998 | |
| WO | WO 9950163 A1 | | 10/1999 | |
| WO | WO 2009103736 A2 | | 8/2009 | |

OTHER PUBLICATIONS

Minnesota Pollution Control Agency; Best Management Practices for Treating Waste Polyester-Resin and Gelcoat; MPCA Hazards Waste Division; 1997.
J.-P. Pascault, R.J.J. Williams: "Epoxy Polymers—New Materials and Innovations"; 2010 Wiley-VCH Verlag GmbH & Co. KGaA, Weinheim; ISBN: 978-3-527-32480-4.

* cited by examiner

*Primary Examiner* — Robert Sellers

(57) ABSTRACT

A casting apparatus is provided. The apparatus comprises a resin overflow container for use in casting processes, comprising: a curing accelerator for a resin in the overflow container. The resin overflow container may include a compartment arranged within the overflow container. The compartment may be adapted to release the curing accelerator after the overflow container has been at least partly filled with resin. The apparatus may also include a mold; and a drain connecting the mold and the overflow container or being part of an overflow container outlet for drawing off resin of the overflow container.

7 Claims, 1 Drawing Sheet

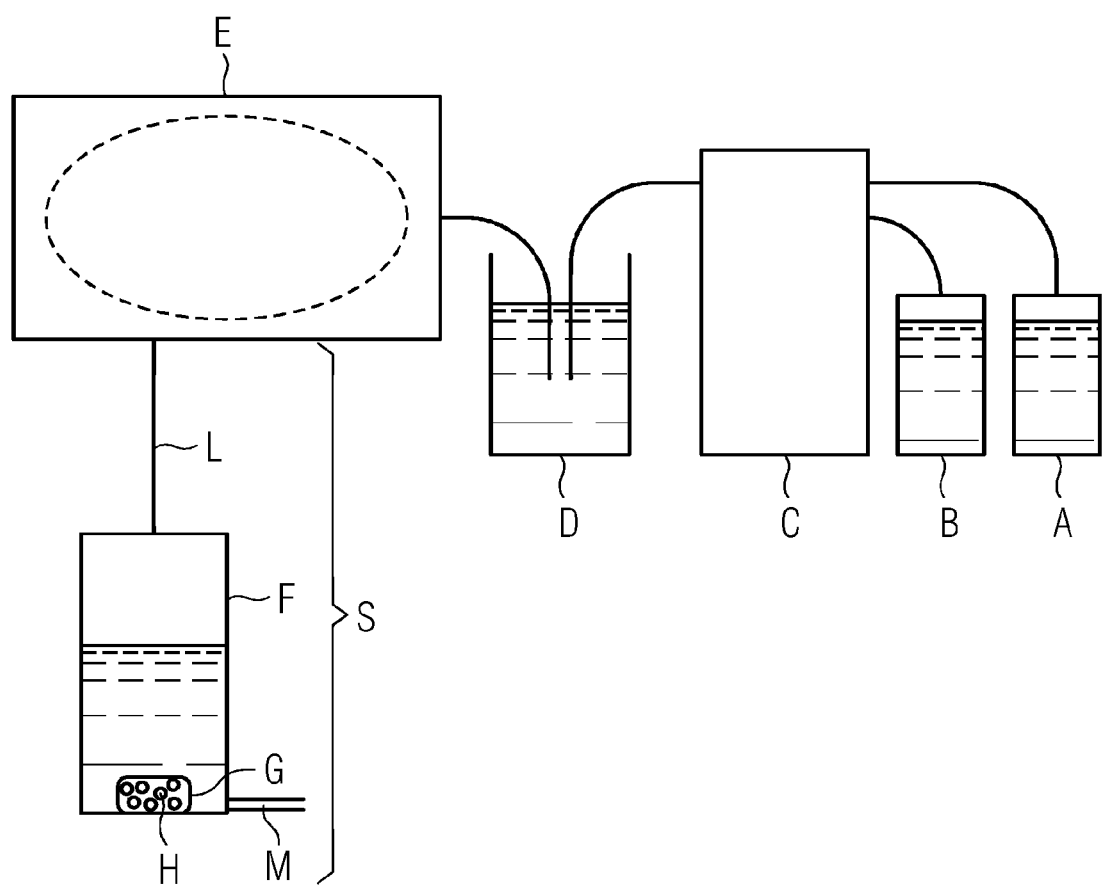

METHOD OF ACCELERATING THE CURING PROCESS IN RESIN OVERFLOW SYSTEMS FOR THE USE IN CASTING PROCESSES

CROSS REFERENCE TO RELATED APPLICATIONS

The present application is a divisional of U.S. application Ser. No. 13/950,340 filed Jul. 25, 2013, now U.S. Pat. No. 9,085,657, which claims priority to European Patent Application No. 12179633.8 filed Aug. 8, 2012, all of which applications are hereby incorporated herein by reference in their entirety.

FIELD OF INVENTION

A method of accelerating the curing process in resin overflow systems for the use in casting processes, especially resin infusion or resin transfer moulding (RTM) or vacuum assisted resin transfer moulding (VARTM) processes, is provided as well as a resin overflow container for the use in casting processes and a compartment for being provided in an overflow container of a casting process and comprising a curing accelerator.

BACKGROUND OF INVENTION

WO 2009/103736 describes a vacuum infusion or vacuum assisted resin transfer moulding process used for moulding fibre composite mouldings. In such a process uniformly distributed fibres are layered in a first mould part, the fibres being rovings, i.e. bundles of fibre bands, bands of rovings or mats, which are either felt mats made of individual fibres or woven mats made of fibre rovings. A second mould part, which is often made of a resilient vacuum bag, is subsequently placed on top of the fibre material. By generating a vacuum in the mould cavity between the inner side of the first mould part and the vacuum bag, the liquid polymer can be drawn in and fill the mould cavity with the fibre material contained in the mould. So-called distribution layers or distribution tubes (in the following also called inlet channels) are used between the vacuum bag and the fibre material in order to obtain as sound and efficient distribution of polymer as possible. In most cases the polymer applied is polyester, vinyl ester or epoxy, and the fibre reinforcement is most often based on glass fibres or carbon fibres, but may also be plastic fibres, plant fibres or metal fibres.

During the process of filling the mould, a vacuum, i.e. an under-pressure or negative pressure, is generated via vacuum openings in the mould cavity, whereby the mixed epoxy is drawn into the mould cavity via the inlet channels in order to fill said mould cavity. From the inlet channels the resin disperses in all directions in the mould cavity due to the negative pressure as a flow front moves towards the vacuum channels.

Therefore, the apparatus further comprises a flow sensor for measuring an airflow arranged so as to be able to measure the airflow through the interior of the sealed container. The sealed container is used as an overflow container for collecting excess resin from the filling process.

After casting, these overflow containers will be emptied. In order to avoid any hazardous situations during this step, it is demanded to wait until the mixed resin in the overflow container is solidified before discarding the hardened resin.

One option is to wait a long time or to heat the resin mixture for enhancing the curing rate and, thus, speeding up the solidification process.

SUMMARY OF INVENTION

It is an object to solve the above mentioned problems and to improve the casting processes, in particular to enhance the productivity of such a process such as a resin infusion or RTM or VARTM process. It is also an object to provide an overflow container and a compartment for being provided in an overflow container of such casting processes.

The objects are achieved by a method of accelerating the curing process in resin overflow systems for the use in casting processes, a resin overflow container for the use in casting processes and a compartment for the use in casting processes as claimed in the claims.

The method of accelerating the curing process in resin overflow systems for the use in casting processes, in the following described by referring to a resin transfer moulding (RTM) process without limiting the invention to RTM processes, comprises the step of adding a curing accelerator for the resin into the resin overflow system for collecting excess resin from the filling process. The curing accelerator enhances the solidification rate of the excess resin in the curing process. Thus, the solidification process can be accelerated or speeded up and permits a faster removal of the excess resin from the resin overflow system after the RTM process or the filling of an overflow container of the resin overflow system has been stopped. In addition, the faster curing reaction advantageously makes the handling of the resin overflow system, especially the overflow containers, during the removal process safer because of the improved curing reaction without the need of an external heating of the excess resin contained or remained in the overflow system. An optional heating could be used together with the method as described above in order to improve the solidification reaction.

A curing accelerator is a substance accelerating the curing process of the resin and can be a catalytic hardener or curing agent. A catalytic hardener can, for example, be a component releasing heat to the uncured resin mixture by starting an exothermic reaction in the resin mixture to be cured and, thus, increasing the polymerization rate. Alternatively, the curing accelerator can be a substance adding an additional curing mechanism of the curing process. For example, the rate of a regular step (growth) polymerization mechanism used in the casting process can be exceeded by the polymerization rate of an ionic polymerization reaction or free radical polymerization. Hence, the dominating polymerization mechanism is changed from step growth to ionic or radical. This can be done by adding an ionic polymerization initiator, advantageously in a catalytic amount, for example in an amount of about 0.05 to 10 wt-%, preferably about 0.1 to 5 wt-% and in particular about 0.2 to 4 wt-%. The curing accelerator is used for starting of the ionic polymerization reaction only, which is self maintaining until all reactive groups in the resin have undergone polymerization. Thus, after the new polymerization reaction mechanism has been started, a further addition of the curing accelerator is not demanded unless the polymerization reaction was stopped. In case of epoxy or vinyl based polymerization reactions, a step polymerization (also called step growth polymerization) and a free radical polymerisation, respectively, takes place at a higher temperature than an anionic or cationic polymerization reaction. That means the step polymerization between the resin monomers or oligomers and the curing agent, generally has higher activation energy than the ionic polymerization because of the different reaction mechanisms. After having started the ionic polymerization, the heat release for this polymerization enhances the polymerization rate of the step polymerization reaction. Initiation of a free radical polymerization, for example, takes place in case the temperature reaches a critical value or the mixed resin is exposed to UV light.

In a further aspect, a resin overflow container for the use in casting processes comprises therefore a curing accelerator for the resin in the overflow container. At the time of adding the resin into the container and bringing the curing accelerator into contact with the resin, the above described initiation of an exothermic reaction or the initiation of an additional polymerization reaction, such as an ionic or free radical polymerization, can take place. Thus, the overflow container with the curing accelerator allows a safer handling of the excess resin in RTM processes, because of the acceleration of the solidification process of the resin in the overflow container.

According to a further aspect, a compartment for being provided in an overflow container of an RTM process comprises a curing accelerator and being adapted to release the curing accelerator after the overflow container has been at least partly filled with resin. This compartment can be used to facilitate a safer handling of the overflow system components, especially the overflow container. Due to the improved polymerization rate, the compartment can be used to improve the economy of RTM processes.

Particularly advantageous embodiments and features are given by the dependent claims, as revealed in the following description. Further embodiments may be derived by combining the features of the various embodiments described in the following, and features of the various claim categories can be combined in any appropriate manner. For a better understanding, it is described an RTM process without being delimited to such a specific casting process. The provided method may be used with any casting process such as, e.g., a resin infusion or VARTM processes.

In a preferred embodiment of the method according to the first aspect, the resin overflow system comprises an overflow container and/or a drain connecting the mould and the overflow container or being part of an overflow container outlet for drawing off resin of the overflow container. Drains can be hoses or open channels and can optionally contain valves and connectors, etc. The overflow system parts such as the hoses or overflow containers are preferably made of a material sustaining high temperatures and being not soluble by one of the resin components. Exemplified materials are metals or polyvinylchloride (PVC). As the hoses generally are disposed after each RTM process together with the cured resin inside of the hoses, the hose material is for economic reasons preferably made of PVC.

The overflow containers are used to collect the excess resin flowing out of the mould. The hoses or channels are generally used to connect the mould with the overflow containers for transferring uncured resin from the mould to the overflow containers after the casting process has been completed. When the overflow containers are removed during de-moulding of the casted product, the uncured mixed resin in the hoses was in conventional processes uncured. Conventionally, the workers handling the overflow system, especially the hoses filled with the uncured resin had to wear special safety clothing. The safety of the workers is improved by using a curing accelerator in the overflow system, such as in the overflow container and/or the hoses, because of the acceleration of the solidification reaction.

Advantageously, the curing accelerator is added to the uncured resin contained in the resin overflow system by an injection method. Injection method means the addition of a curing accelerator in a liquid form or solution. For injecting the curing accelerator into a hose, it is preferred to fill a syringe with the curing accelerator and injecting it into a hole in the hose. The hole can either be generated by a needle used together with the syringe or can be a branch line which can be connected with the syringe and containing a valve for closing the branch line during the RTM process.

The hole in the hose can be sealed by an adhesive tape which is wrapped around the hose after the needle has been removed. Alternatively, the needle may be retained in the hole and covered with an adhesive tape.

The curing accelerator preferably can be injected at the highest point of the overflow system, especially at the beginning of the hose, i.e. shortly after the connection point at which the hose is connected to the mould outlet. This ensures minimum leakage of resin through the hole inflicted by the injection. The curing reaction preferably is maintained by the heat generated by the polymerization reaction in order to solidify the resin within the total hose which is generally a confined space where the addition of curing accelerator is more complicated than in the overflow container of the resin overflow system. Advantageously, the curing accelerator can be added at a number of different sections of the hose, especially in case the mixing of the curing accelerator with the resin is hindered. Thus, the solidification reaction can be accelerated from several sections of the hose, improving the hardening of the resin in the hose, especially in case of hoses having a small diameter.

In an alternative preferred embodiment of the method, the curing accelerator can be provided in the overflow container before the resin is charged therein or filled into the container after the RTM process has been completed. Thus, as soon as the excess resin flows into the overflow container, the polymerization reaction can be started and can be maintained as long as new excess resin is poured into the container. Advantageously, the curing accelerator acts in a catalytic manner so that at the start of the polymerization process only, a direct contact between the curing accelerator and the resin is demanded.

According to a further preferred embodiment of the method, the curing accelerator is provided in a compartment of the overflow container and is released after the overflow container has been at least partly filled with the excess resin that means that some parts or most parts or all parts of the surplus resin are already placed in the overflow container. The compartment with the curing accelerator advantageously is separated from the resin inlet into the overflow compartment in order to release the curing accelerator, i.e. bringing the curing accelerator in contact with the excess resin, for starting or accelerating the polymerization reaction at a desired time. Thus, the temperature in the overflow container can be controlled, for example, before the curing reaction is started in order to avoid overheating and inflammation of the resin mixture in the overflow container. If a suitable temperature has been reached, for example as the stepwise polymerization reaction slows down, the curing reaction by means of the curing accelerator can be started and the excess resin can be solidified.

In an alternative embodiment of the method, the curing accelerator can be added into the excess resin in the overflow container. Advantageously, the curing accelerator can be added in the form of a solution or in a powder form. Thereby, the curing accelerator can suitably distributed in the resin and can initiate the polymerization or solidification reaction.

In order to improve the distribution within the resin, a stirrer can be provided in the overflow container.

According to another embodiment of the method, the resin used in the RTM process and to be solidified in the overflow container comprises or contains an epoxy resin or vinyl based resin as the main component. Main component means that at least 50 percent of the resin monomers are epoxy monomers or vinyl monomers, while suitable co-monomers or side chain monomers can be present. Preferably, the epoxy resin is polymerized by means of a step polymerization process during the RTM process. A step polymerization usually is initiated by means of amines, mercaptanes, isocyanates or acids, wherein primary or secondary amines are the most commonly used curing agents or hardeners for epoxides. Thus, the curing accelerator can either accelerate the step polymerization or can add an additional polymerization mechanism. For example, an ionic polymerization, such as an anionic polymerization or a cationic polymerization, or a free radical polymerization may be initiated.

In order to change the dominating polymerization mechanism from a step polymerization to an anionic polymerization mechanism, it is preferred to select the curing accelerator from tertiary amines, imidazoles, ammonium salts. From the view of costs and simplicity, ammonium chloride is most preferred as the curing accelerator for the case that primary or secondary amines are used as the hardener for epoxy resins or vinyl based resins in the RTM process.

In order to generate heat through the reaction of the curing accelerator with the resin mixture, it is preferred to use an anhydride or a carboxylic acid, preferably a hydrophobic carboxylic acid. Exemplified suitable hydrophobic acids are preferably monovalent carboxylic acids having an alkyl residue with two or more carbon atoms, for example, ethanoic, propanoic, butanoic, pentanoic, hexanoic, heptanoic or octanoic acid or the like. More preferably, the carboxylic acid has a long alkyl chain (alkyl with 4 or more carbon atoms, preferably 4 to 20, more preferably 6 to 12 carbon atoms) without any substituents or with hydrophobic substituents such as alkyl residues etc.

The addition of a curing accelerator generating heat inside the resin mixture by means of initiating an exothermic reaction is advantageous over a technique of applying heat from outside to the overflow system such as the hoses of the overflow container. Especially it is quite easier to add the curing accelerator at the respective treatment side than to place heating blankets around the overflow system. It is a technologically simpler and cheaper solution because no electrical power is necessary. In addition, the acceleration of the curing reaction of excess resin improves the working environment and the safety of the workers.

In order to provide the above-mentioned curing accelerators in the resin overflow container, a preferably sealed compartment for the curing accelerator within the overflow container can be used. Thus, the curing acceleration reaction that means either the curing acceleration by generating heat or by changing the curing mechanism by means of contacting the curing accelerator with the excess resin can take place within the overflow container at a predetermined time.

According to a preferred embodiment of the resin overflow container, the compartment is adapted to release the curing accelerator after the overflow container has been at least partly filled with resin in order to start the solidification reaction at a predetermined time. By the provision of a sealed curing accelerator compartment, the overflow containers can advantageously be stored some time without losing the reactivity of the curing accelerator. Therefore, the invention relates to such a compartment for being provided in an overflow container of a casting process. Thereby, provided in the overflow container can mean that the compartment is already mounted in the overflow container, for example being a separate part of the container wall or the container bottom, or being adapted to can be placed in the container in the form of a separate enclosure such as a bag. In this case, the compartment can be stored separately and being placed in the overflow container before the casting process is started or can be put into the overflow container after the container has been at least partly filled with excess resin. In this case separate portions of curing accelerator filled in bags are preferred for cost efficiency.

In another preferred embodiment of the overflow container, the compartment is provided in the form of a bag comprising a wall material being soluble in the resin or being meltable at a predetermined temperature. Thus, the curing accelerator is sealed within the bag and can be released by bringing the bag into contact with the resin, which usually is hot at the time of flowing into the overflow container because of the maintaining polymerization reaction. Thus, the hot resin can be used to dissolve the bag and to release the curing accelerator. The solidification reaction, such as the anionic polymerization, can be initiated when the bag has been at least partly dissolved. As the compartment can be sold separately, it is preferred to provide the compartment comprising the curing accelerator in advance which can then be used for being placed in the overflow container before filling it with a resin or putting it into the at least partly filled overflow container.

Exemplified bag materials are polyvinyl butyral (PVB), poly ethylene methylacrylate (PEMA), or poly methylene methylacrylate (PMMA) homo- or co-polymers which are suitable materials being soluble in epoxy resin mixtures. The bag containing, for example, ammonium chloride as the curing accelerator can be positioned at the bottom of the empty overflow container. At the time of filling the overflow container with the mixed epoxy resin during the RTM process, the PVB bag dissolves and the ammonium chloride is released into the mixed epoxy resin. In case a vinyl based resin is used in the RTM process, a vinyl soluble resin material such as polystyrene can be used as the preferred bag material.

The overflow container, the compartment and the method can advantageously be used in casting processes such as resin infusion or RTM or VARTM processes, especially in the manufacturing of wind turbine parts such as wind turbine blades because especially in those processes high amounts of excess resins such as epoxy or vinyl based resins are produced. The use of a curing accelerator in such overflow containers increases the speed of the curing reaction and, thus, is a simple solution and minimizes the hazardous conditions in the conventional processes used for safer handling the excess resins from such casting processes like heating the excess resins by an electrical heating means for promoting the curing reaction and the like. In addition, the solidification is quicker and takes place at lower temperatures so that the working environment of the workers is improved also in relation to their safety.

Other objects and features will become apparent from the following detailed description considered in conjunction with the accompanying drawing. It is to be understood, however, that the drawing is designed solely for the purpose of illustration and not as a definition of the limits of the invention.

BRIEF DESCRIPTION OF THE DRAWINGS

The FIGURE shows a schematic cross-sectional view of an RTM apparatus comprising a bag with a curing accelerator in the overflow container.

DETAILED DESCRIPTION OF INVENTION

The FIGURE shows an RTM apparatus with a pure resin container A, a pure hardener or curing agent container B, a mixing unit C, a mixing bucket D, a blade mould E, and a resin overflow system S containing an overflow container F for excess resin, a hose L and an overflow container outlet hose M for discharging resin from the overflow container F. Moreover, a bag G with a curing accelerator H is provided at the bottom of the overflow container.

The RTM process is done by mixing the pure resin (an epoxy resin) and the pure hardener (an amine) in the mixing unit C and pouring the resin/hardener mixture into the mixing bucket D. The resin/hardener mixture is then used for casting the blade in the blade mould E by means of a resin transfer moulding process. Of course other casting processes can be used as well.

After the moulding of the blade in the blade mould E, the excess resin is collected in the resin overflow container F wherein the curing accelerator H, for example ammonium chloride $NH_4Cl$, is placed in the bag G. After the bag G (in this example a PVB bag) has been dissolved by direct contact with the resin mixture, the ammonium chloride comes into contact with the epoxy resin. The addition of ammonium chloride initiates an anionic polymerization in the mixed epoxy, which supplements the step polymerization taking place between the amine groups in the hardener and the epoxy groups in the resin.

The anionic polymerization proceeds at a lower temperature than the step polymerization, thus increasing the polymerization rate at ambient temperature in the overflow container F. The mixed epoxy in the overflow container F cures faster after the addition of the ammonium chloride because of the change of the dominating polymerization mechanism from a step polymerization to an anionic polymerization. The ammonium chloride acts in a catalytic amount. The initiation of the anionic polymerization with the first parts of excess resin filled into the overflow container F is suitable to initiate the anionic polymerization. The heat generated by this polymerization mechanism enhances the polymerization rate of the step polymerization. A continuous addition of curing accelerator H is thus not necessary unless the anionic polymerization reaction is stopped.

After the hardener/resin mixture has been fully solidified by using the curing accelerator H as explained above, the resin mixture can be disposed in the usual manner. In the fully solidified status, the disposal of the excess or surplus resin in the form of a highly reactive resin/hardener mixture can be carried out safely. Because of the acceleration of the curing reaction, the total time for the process is shorter as in conventional processes.

Although the present invention has been disclosed in the form of preferred embodiments and variations thereon, it will be understood that numerous additional modifications and variations could be made thereto without departing from the scope of the invention. While the invention has been described with reference to VARTM processes for manufacturing wind turbine blades, other resin composite materials such as wings or rotors for airplanes, helicopters, coolers, or car parts as well as parts in the automotive industry or similar devices may also be prepared with the method of the invention. The overflow container can generally be used in the field of casting processes or resin transfer moulding processes, e.g. in vacuum assisted resin intrusion processes etc. For the sake of clarity, it is to be understood that the use of "a" or "an" throughout this application does not exclude a plurality, and "comprising" does not exclude other steps or elements. A "container" or "unit" can comprise a number of separate containers or units, unless otherwise stated.

The invention claimed is:

1. An apparatus comprising:
    a resin overflow container for use in casting processes, comprising: a curing accelerator for a resin in the overflow container;
    a mould; and
    a drain connecting the mould and the overflow container or being part of an overflow container outlet for drawing off resin of the overflow container.

2. The apparatus according to claim 1, further comprising: a compartment arranged within the overflow container for the curing accelerator.

3. The apparatus according to claim 2, wherein the compartment is adapted to release the curing accelerator after the overflow container has been filled at least partly with resin.

4. The apparatus according to claim 3, wherein the compartment is a bag comprising a wall material being soluble in a resin or being meltable at a predetermined temperature.

5. The apparatus according to claim 1, wherein the resin is an epoxy resin or a vinyl based resin.

6. The apparatus according to claim 1, wherein the curing accelerator is selected from the group consisting of tertiary amines, imidazoles, ammonium salts, anhydrides, a carboxylic acid, and a combination thereof.

7. An apparatus comprising:
    a compartment for use in casting processes, comprising:
        a curing accelerator,
        wherein the compartment is arranged within an overflow container, and
        wherein the compartment is adapted to release the curing accelerator after the overflow container has been at least partly filled with resin,
        wherein the compartment is a bag comprising a wall material being soluble in the resin or being meltable at a predetermined temperature;
    a mould; and
    a drain connecting the mould and the overflow container or being part of an overflow container outlet for drawing off resin of the overflow container.

* * * * *